MAGNETICALLY ACTUATED REED SWITCHES

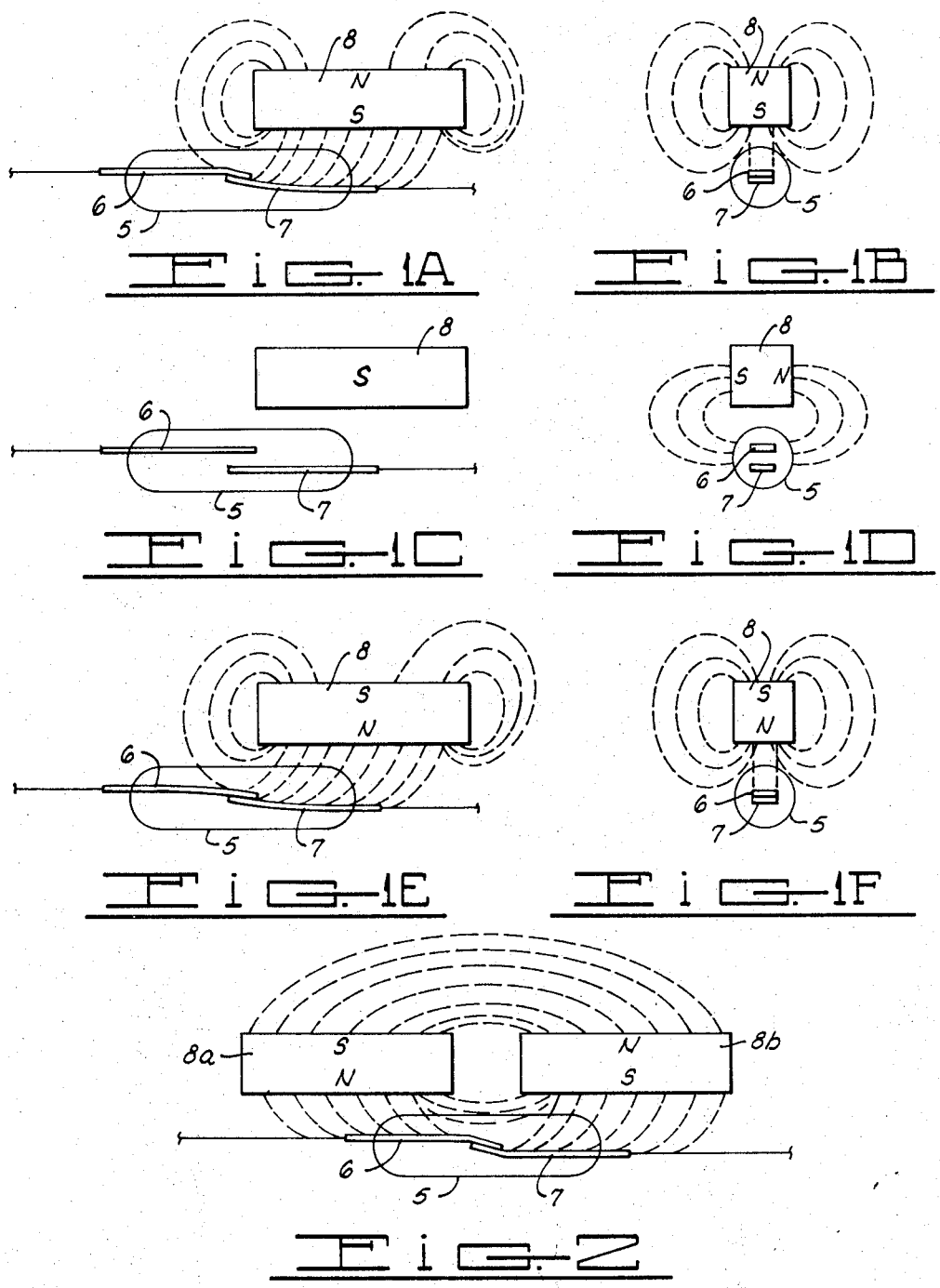

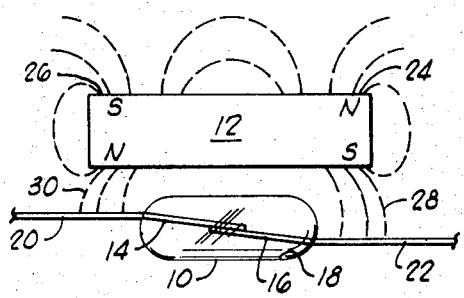
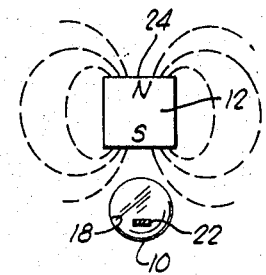
Fig. 3A  Fig. 3B
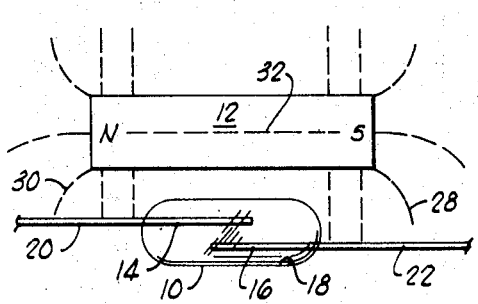
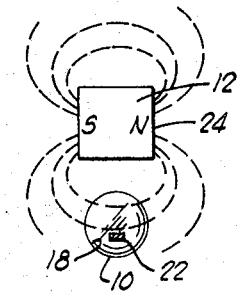
Fig. 3C  Fig. 3D
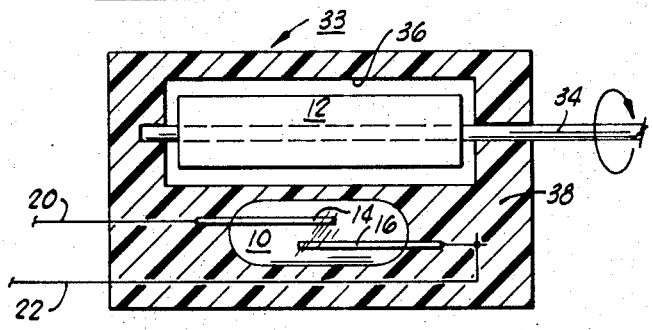
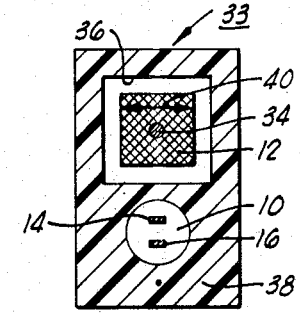
Fig. 4A  Fig. 4B Jan. 26, 1971  W. T. POSEY  3,559,124

Filed Feb. 19, 1969  5 Sheets-Sheet 5

INVENTOR
WILLIAM T. POSEY

BY
Dunlap, Laney, Hessin & Dougherty
ATTORNEYS

United States Patent Office
3,559,124
Patented Jan. 26, 1971

3,559,124
MAGNETICALLY ACTUATED REED SWITCHES
William T. Posey, Chickasha, Okla., assignor to Hermetic Switch, Inc., Chickasha, Okla., a corporation of Oklahoma
Filed Feb. 19, 1969, Ser. No. 800,473
Int. Cl. H01h 51/28
U.S. Cl. 335—205
16 Claims

ABSTRACT OF THE DISCLOSURE

A compact reed switch device capable of extremely high sensitivity applications, the device consisting of ceramic or other magnet material polarized through a thin dimension, and being disposed adjacent a hermetically sealed reed switch assembly such that the magnet material can be rotated about the axis of a long dimension to effect sequential opening and closing of the reed switch device.

BACKGROUND OF THE INVENTION

(1) Field of the invention

The invention relates generally to permanent magnet actuated reed switch devices and, more particularly, but not by way of limitation, it relates to improvements in such switches utilizing ceramic magnet materials having unique polarization properties.

(2) Description of the prior art

The prior art includes many and diverse types of magnetic reed switch and attendant structures for actuating such switches. Actuation of reed switches generally involves the physical movement of a magnet as a whole, and this requires a relatively large space to rotate the axis of polarization of the magnets or to move the magnet a sufficient distance from the switch contacts. Such requirements have given rise to many and varied types of large, complicated mechanisms for generating magnetic force to effect switch actuation. Whether the reed switches have been actuated by proximity of the magnetic field or by polarity orientation of the magnet, the prior types of structure have not provided a consistent control of switching sensitivity, and the attainment of really fine sensitivities has been elusive.

SUMMARY OF THE INVENTION

The present invention contemplates a magnet actuated switch wherein an anisotropic magnet substance polarized along a short dimension axis is controlled as to rotation about a long dimension axis to control opening and closing of a magnetic reed switch. In a more limited aspect, the invention consists of a hermetically sealed reed switch suitably supported adjacent and parallel to the long dimension axis of a ceramic magnet material which is polarized through a short dimension axis of the magnet substance and disposed in actuating position relative to the reed switching elements.

Therefore, it is an object of the present invention to provide a magnetically actuated reed switch which is susceptible of more compact construction.

It is also an object of the invention to provide a reed switch device which is actuatable in response to minimal input motion or effort.

It is still a further object of the invention to provide a magnetic reed switch which is small in size and which can be readily mounted to receive various forms of input actuating motion.

Finally, it is an object of the present invention to provide a magnet actuated reed switch which is compact, ruggedized, and economical of construction and maintenance, which reed switch is especially useful for high sensitivity applications such as thread break detection, air flow detection, and such.

Other objects and advantages of the invention will be evident from the following detailed description when read in conjunction with the accompanying drawings which illustrate the invention.

BRIEF DESCRIPTION OF THE DRAWINGS

FIGS. 1A and 1B are a functional plan view and end view, respectively, of a magnet actuated switch constructed in accordance with the present invention;

FIGS. 1C and 1D are a functional plan view and end view, respectively, of the switch of FIGS. 1A and 1B in a different operating attitude;

FIGS. 1E and 1F are a functional plan view and end view, respectively, of the switch of FIGS. 1A and 1B in still another operating attitude;

FIG. 2 illustrates an alternative configuration of reed switch device utilizing dual magnet actuators;

FIG. 3A is a functional plan view of the invention;

FIG. 3B is an end view of the switch of FIG. 3A;

FIG. 3C is a functional plan view of the invention with the reed switch actuated open;

FIG. 3D is an end view of the invention as shown in FIG. 3C;

FIGS. 4A and 4B are longitudinal and transverse vertical sections, respectively, of a magnetically actuated reed switch constructed in accordance with the invention;

DETAILED DESCRIPTION OF THE PREFERRED EMBODIMENT

Figures 5A, 5B:
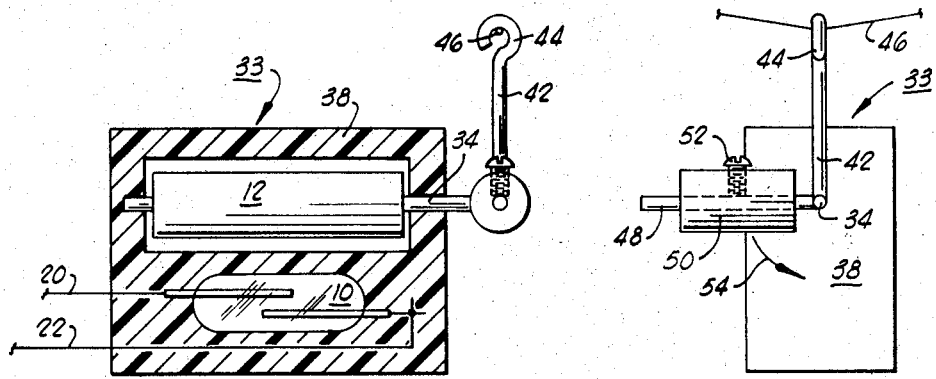
FIGS. 5A and 5B are a longitudinal vertical section and an end view, respectively, of a thread detector constructed in accordance with the invention.

The present invention is directed toward the construction of a magnetically actuated reed switch which can be encased in a relatively small or narrow package. This is made possible by utilization of an anisotropic magnet substance which favors polarization in its lesser or least dimension. This is opposed to conventional metallic or paramagnetic materials, i.e. aluminum-nickel-iron-cobalt and various other combinations, which are most readily polarized in the direction of the longest dimension of their form.

Such material as employed in the present invention, i.e. material which is most readily and reliably polarized in a short dimension, may be a magnet material known as ceramic permanent magnet. One such suitable material is known as "Magnite V," an anisotropic ceramic permanent magnet which is formed from a material having a single, preferred direction of magnetization, and which magnet material is commercially available from the Magno-Ceram Company of South Plainfield, N.J. The ceramic magnets are generally formed from oxides of iron and barium in varying ratios, and, while ceramic magnets are particularly desirable for use in the present invention, it should be understood that any magnetizable material having the desirable cross-polarization properties might be employed.

FIGS. 1A and 1B depict one manner in which such material, magnetized through a short dimension, can be utilized to construct a very compact reed switch and actuator which is capable of extremely sensitive operations in compact structure. A reed switch 5 containing reed contacts 6 and 7 is aligned parallel to an elongated magnet 8. The magnet 8 is polarized across a short dimension, perpendicular to reed switch 5, and the magnet 8 is disposed so that it is parallel and primarily adjacent to a single side or reed contact 7 of reed switch 5. Thus, flux emanating from the south pole of magnet 8 finds a preferential path through reed contact 7, creating flux at the contact gap and tending to attract it toward reed contact 6 for electrical contact therewith. The reed switch 5 may be a standard form of commercially available, hermetically sealed reed switch.

FIGS. 1C and 1D depict the same switch device with reed switch 5 in a non-contacting attitude after a ninety degree rotation of magnet 8. The magnet 8 has been rotated a quarter-turn about the long dimension axis such that the magnetic lines of force between north and south poles of magnet 8 are equal in effect as seen by the responding reed contact 7. FIGS. 1E and 1F show the effect of continued rotation of magnet 8 through a next quarter-turn. The north pole has been brought closely adjacent to reed contact 7 which receives and directs south pole flux so that sufficient magnetic flux is developed across the contact gap to effect closure of reed contacts 6 and 7.

FIG. 2 depicts an alternative structure wherein two such magnets 8a and 8b may be utilized to effectively double the magnetic actuating power or capability. In this case, each of magnets 8a and 8b is polarized through a thin dimension, and each is disposed parallel and adjacent to a single one of reed contacts 6 and 7, respectively. Carrying this principle a step further, and taking advantage of the unique polarization characteristics of such as the ceramic magnet materials, a reed switch 10, such as shown in FIGS. 3A, B, C and D, can be constructed such that it is rotationally actuatable by rotation of a magnet 12 about a long dimension while the disposition of magnet 12 and reed switch 10 requires a minimum elongation of the switch structure. The reed switch 10 is positioned next to a magnet 12 which is cross-polarized in such manner as to effect closure of reed contacts 14 and 16 of the reed switch 10. The reed switch 10 may be one of the commercially available types consisting of a glass envelope 18 hermetically sealed about lead-in wires 20 and 22 which are in conductive affixture to internal reed contacts 14 and 16.

Magnet 12 is a ceramic magnet or such capable of short-dimension polarization and it is polarized in a first orientation through its short dimension at end 24 while being oppositely polarized in parallel disposition through opposite end 26. In this orientation as shown in FIGS. 3A and 3B, the oppositely oriented flux lines, shown generally as 28 and 30, find a path of increased permeability through the lead-in conductors 20 and 22 to force closure of the gap between reed contacts 14 and 16, thereby to allow electrical current flow through the reed switch 10.

FIGS. 3C and 3D illustrate the magnet 12 and reed switch 10 as its exists when actuated open. Thus, magnet 12 has been rotated about its long-dimension axis 32 by ninety degrees relative to the position of FIGS. 3A and 3B such that there is no longer a preferred flux path through the reed contacts 14 and 16. That is, each reed contact 14 and 16 is subject to equal but opposite magnetic force fields at a right angle to the reed contacts as shown in FIG. 3D, but this force field extends between poles at each side of the magnet 12 will the net magnetic flux across the gap of contacts 14 and 16 being zero. Such a flux condition will not effect closure of the contacts 14 and 16. Upon another quarter rotation of magnet 12, the attractive flux lines, similar but opposite those shown in FIG. 3A, will again be positioned to effect closure of the reed switch contacts 14 and 16.

FIGS. 4A and 4B illustrate the manner in which the magnetic elements shown schematically in FIGS. 3A through 3D can be assembled into a reliable working unit. Thus, the cross-polarized magnet 12 is secured on an actuating shaft 34 which suspends magnet 12 rotatably within a cavity 36 formed within a suitable switch casing 38. Switch casing 38 may be formed by any of several conventional plastics forming techniques, i.e. molding, milling, potting, etc. The reed switch 10 and its respective lead-in wires 20 and 22 are also disposed in secure positioning within switch casing 38, and reed switch 10 is held in proper proximity to magnet 12 so that it enables actuation of reed contacts 14 and 16 upon rotation of magnet 12 by actuating shaft 34. As shown in FIG. 4B, the magnet 12 would be oppositely cross-polarized at spaced points in the direction indicated by arrow-line 40 when reed switch contacts 14 and 16 were in the open position. A ninety degree rotation of magnet 12 would effect complete and secure closure of the reed contacts 14 and 16.

FIGS. 5A and 5B illustrate an application of reed switch assembly 33 wherein it fulfills a thread-break detection function. The actuating shaft 34, being rotatably journaled in switch casing 38 is formed to have a right-angle extension 42 which extends upward to form a guide eye 44 that is adapted to receive a moving thread 46 or such therethrough. A second right-angle extension 48, also being perpendicularly disposed to first right-angle extension 42, receives a selected mass or weight 50 thereon as secured by a set screw 52. Thus, in this application, the weight 50 is actually very small and will allow the guide eye 44 to ride freely on a thread 46 or such as long as it is properly tensioned therethrough; however, upon breakage of thread 46, weight 50 is sufficient to cause rotation of the entire armature assembly and actuating shaft 34 in the direction of arrow 54 to cause actuation of reed switch 10. Such detector swtiches may find various applications in textile operations, e.g. alarm switch actuation upon thread-break detection.

Figures 6A, 6B:
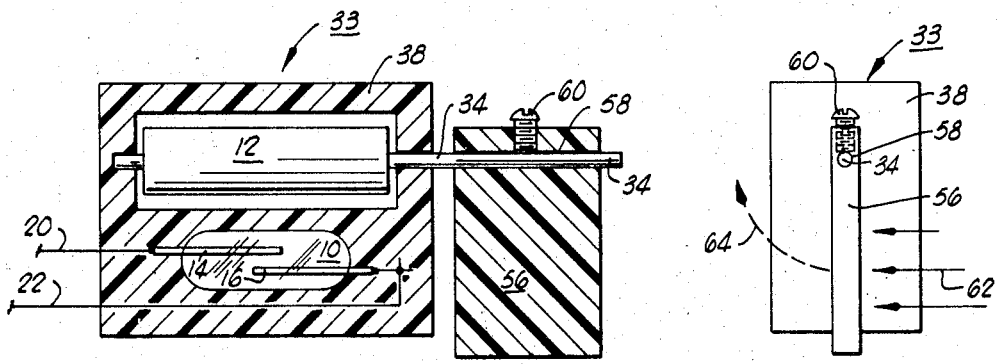
FIGS. 6A and 6B are a longitudinal vertical section and an end view, respectively, of an air flow detector constructed in accordance with the invention.

FIGS. 6A and 6B depict still another application of the reed switch assembly 33 as it might be applied for air flow detection. Thus, the same reed switch assembly 33 extends the actuating shaft 34 out to receive a vane 56 thereon. Vane 56 may be such as a flat, solid piece of material of rectangular shape receiving actuating shaft 34 through a hole 58 for securing by a set screw 60. The reed switch assembly 33 may be suitably mounted to position actuating vane 56 in a duct-way or air flow space (not shown) such that an air flow, such as indicated by arrows 62, will force vane 56 in the clockwise path indicated by dashed-line 64 to actuate the reed switch 10 so that it provides a switch closure output as between lead-in wires 20 and 22. It is not necessary for actuating shaft 34 and, therefore, magnet 12 to make a full ninety degree revolution in order to cause reed contacts 14 and 16 to come together. Depending upon the proximity of reed switch 10 to magnet 12, actuation may be effected with as little as ten to fifteen degrees rotation.

Figures 7, 8:
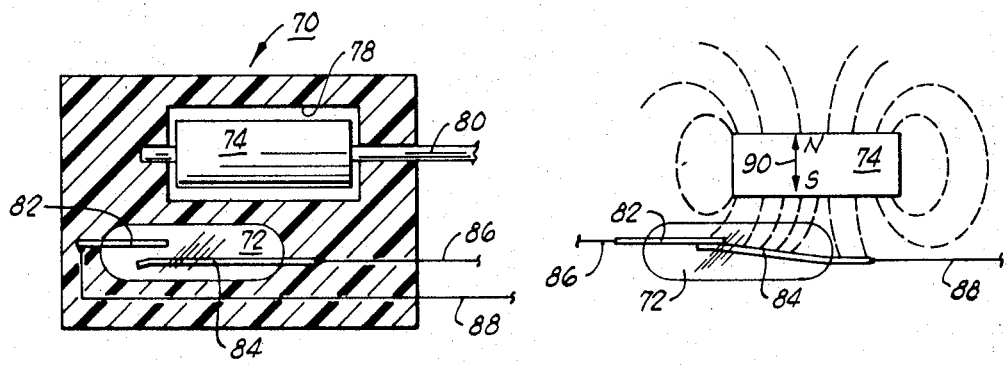
FIG. 7 is a longitudinal vertical section of an alternative form of switch device constructed in accordance with the invention.
FIG. 8 is a functional plan view of the switch device of FIG. 7 when actuated closed.

FIG. 7 illustrates a reed switch assembly 70 which utilizes an off-set gap type of reed switch 72 adjacent to a cross-polarized magnet 74. The reed switch assembly 70 is encased in a casing 76 formed of a suitable plastic, which has a generally rectangular cavity 78 formed therein to receive magnet 74 in rotatable suspension on an actuating vane 80. The reed switch 72 is an off-set gap type which has a short reed contact 82 and an oppositely-disposed reed contact 84 of much longer dimensions such that it is more limber or free to move. Lead-in wires 86 and 88 are then passed through the casing 76 for connection with respective reed contacts 82 and 84.

As shown in FIG. 8, the off-set gap type of reed switch 72 can be actuated by a thin cross-polarized magnet of the ceramic type which is cross-polarized in only one direction along the long dimension. Magnet 74 may be polarized as shown along its entire long dimension, polarization being through the thin dimension in the direction of arrow 90, such that flux lines find a preferential permeability field through reed contact 84 and reed contact 82 to effect a reed contact closure. It should be understood that the general switch control technique as disclosed in FIG. 8 and prior figures can be extended to various types of plural reed switch arrays as actuated by a single ceramic magnet, as will be further described below.

Figure 9:
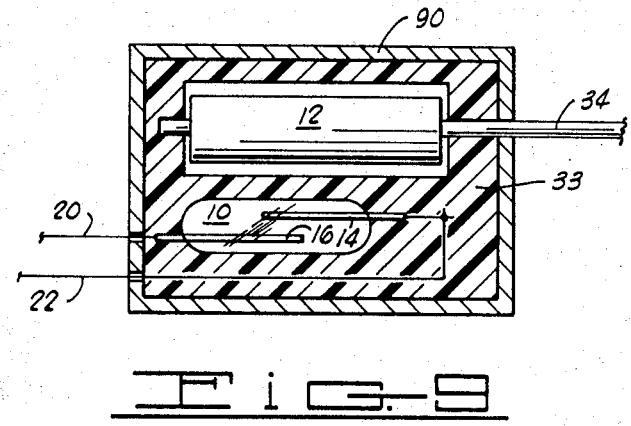
FIG. 9 is a longitudinal vertical section of a switch constructed in accordance with the invention and embodying specific encasement teachings.

FIG. 9 illustrates the manner whereby a reed contact switch device can be magnetically shielded so that it is virtually insensitive to surrounding magnetic effects. In this case, a reed switch assembly 33 is completely encased in a shielding element which consists of a ferrous enclosure. Such magnetic shielding enclosure 90 may be formed from any suitable metallic material having the necessary properties to offer a low magnetic permeability to any intersecting flux lines. Such shielding practice actually increases the magnetic field within the flux circuit which will affect the reed contacts 14 and 16.

Figure 10A:
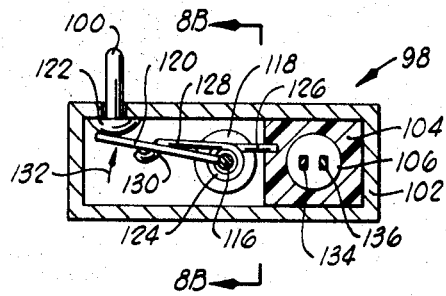
FIGS. 10A and 10B are a vertical section and a transverse vertical section, respectively, of a first form of push button reed switch device.
Figure 10B:
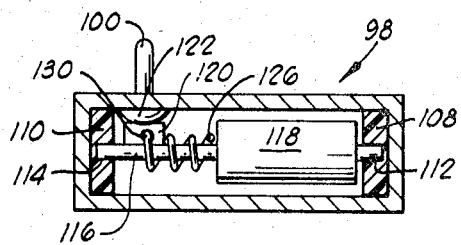

FIGS. 10A and 10B illustrate one form of reed switch assembly 98 which is actuatable by a push-button 100. Reed switch assembly 98 is formed by an external casing 102, which may be a shielding material, and which includes a molded switch frame 104 encasing a reed switch 106 in secure positioning along one side of the interior of the casing 102. The molded frame 104 may be formed from plastic or other suitable material, and it includes a pair of end extensions 108 and 110 which extend parallel along opposite inner ends of one length of the casing 102. Extensions 108 and 110 are formed to have respective opposite holes 112 and 114 within which an actuating shaft 116 carrying magnet 118 is rotatably journaled. The actuating shaft 116 is rigidly secured at a right-angle to an attached lever 120 which extends out into contact with an inner end 122 of push-button 100. A spiral spring 124 is positioned around actuating shaft 116 with one end 126 secured in molded frame 104 and an opposite end 128 affixed through a hole 130 in lever 120 to exert a continual upward force in the direction of arrow 132.

The magnet 118 is shown as being cylindrical in form; however, it should be understood that the cross-sectional configuration of the narrow dimension of magnet 118 is not particularly critical as the material may still be susceptible to cross-polarization in the thin dimension. It should be understood too that the cross-sectional configuration may be varied in order to vary flux distribution in specific switch application. As shown in FIG. 10A, the reed switch assembly 98 is constructed with magnet 118 polarized such that reed contacts 134 and 136 are normally open. Depression of push-button 100 then moves lever 120 oppositely to arrow 132 to rotate actuating shaft 116 counter-clockwise by a sufficient amount to bring about greater than a threshold amount of flux concentration which effects closure of reed contacts 134 and 136. Release of push-button 100 will result in upward movement of actuating lever 120 under the spring force of spiral spring 124 to restore magnet 118 to its de-actuating orientation.

Figure 11A:
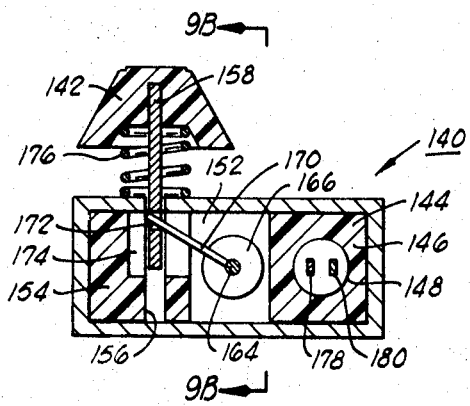
FIGS. 11A and 11B are a vertical section and a transverse vertical section, respectively, of a second form of push button switch device constructed in accordance with the invention.
Figure 11B:
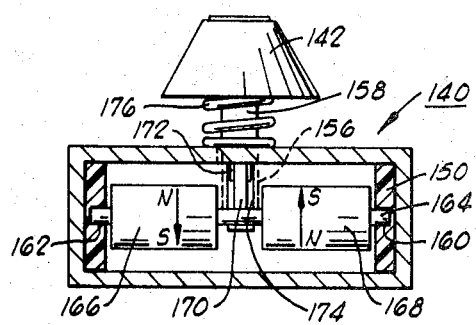

FIGS. 11A and 11B depict another form of push-button switch which consists of a reed switch assembly 140 actuated by a push button 142. A molded inner frame 144, formed of suitable plastic or other potting compound, consists of a body portion 146 which envelopes a reed switch 148, and oppositely disposed inner sidewalls 150 and 152 which are joined to an opposite side body 154. Opposite side body 154 is formed with a slot 156 formed therein for receiving and guiding a push-button stem 158 therethrough. Each of frame side panels 150 and 152 are formed to have oppositely-disposed journal holes 160 and 162 for rotatably receiving an actuating shaft 164 therein.

The actuating shaft 164 supports a pair of spaced, oppositely cross-polarized magnets 166 and 168. The actuating shaft 164 is secured proximate its center to a right-angle actuating lever 170 which extends through a hole 172 formed within push-button stem 158. Limited rotational movement of lever 170 is enabled by provision of a narrow, cubical space 174 formed within the side body 154 of inner frame 144. A compression spring 176 provides push-button return upon removal of actuating pressure from push-button 142.

In operation, push-button 142 can be depressed to move stem 158 downward within guide slot 156 to rotate actuating lever 170 counter-clockwise such that magnets 166 and 168 are rotated to bring about actuation of reed switch 148. That is, a sufficient rotation of magnets 166 and 168 such that flux density through reed contacts 178 and 180 surpasses a threshold value to effect switch closure.

Figure 12A:
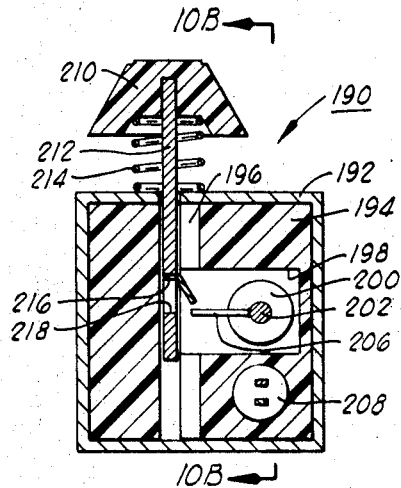
FIGS. 12A and 12B are a vertical section and a transverse vertical section, respectively, of a push button/momentary release type of reed switch.
Figure 12B:
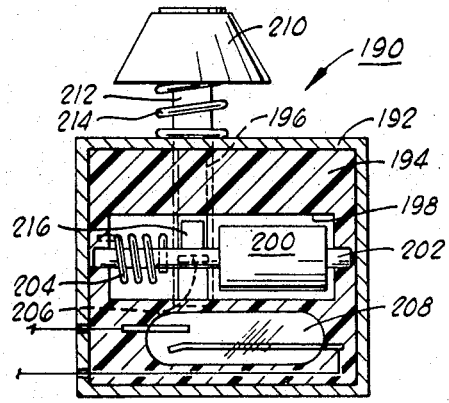

FIGS. 12A and 12B illustrate a push-button switch assembly 190 which has a quick release capability such that it provides a momentary pulse actuation. Switch assembly 190 consists of a casing 192 having an inner frame 194 contained therein. Once again, inner frame 194 may be formed from a suitable plastics or such to include a vertical, T-shaped guide slot 196 in communication with a magnet cavity 198. An actuating magnet 200 is secured on actuating shaft 202 which is journaled in opposite sides of magnet cavity 198; and a spiral spring 204, having one end secured to actuating shaft 202 and the other end secured in the end of magnet cavity 198, is disposed to provide spring return of actuating shaft 202. An actuating lever 206 is suitably affixed at right-angle orientation from actuating shaft 202.

Magnet 200 may be singularly cross-polarized through its more narrow dimension and, in coacting proximity, an off-set gap type of reed contact switch 208 is positioned within inner frame member 194. A push-button 210 is affixed on one end of a slide stem 212 disposed in sliding relationship with stem guide 196. A compression spring 214 mounted beneath push-button 210 and surrounding stem 212 provides push-button return. A spring tab 216, an actuating element formed of resilient spring material, is secured within a cut-out portion 218 of stem 212 such that it extends into a portion of stem guide 196 for periodic contact to depress actuating lever 206.

In operation of switch assembly 190, push-button 210 can be depressed by manual or other force and the downward movement of stem 212 carries spring tab 216 downward into contact with and past the actuating lever 206. Movement of spring tab 216 takes actuating lever 206 downward a sufficient amount to bring about switch closure of the contacts of reed switch 208, an off-set gap type of flux actuation, whereupon it released actuating lever 206 and the return spring 204 immediately returns magnet 200 to its non-actuating orientation. Release of the push-button 210 allows upward movement of stem 212 under the force of spring 214, and spring tab 216 is allowed to bend and return past actuating lever 206 to the quiescent or non-actuated position.

Figure 13:
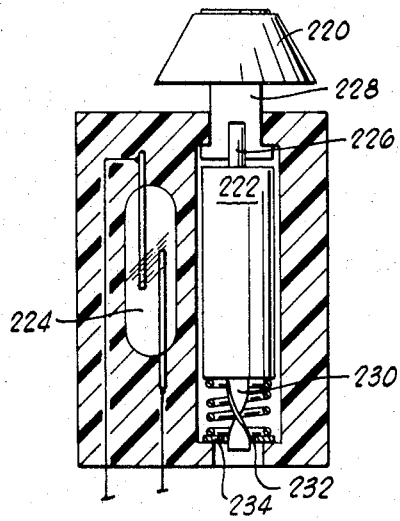
FIG. 13 is a vertical sectional view of a magnetically actuated reed switch having still another form of actuating mechanism.

FIG. 13 discloses still another form of switch actuation of the push-button type wherein depression of a push-button 220 effects rotation of a magnet 222 by an amount sufficient to close the reed contacts of a reed switch 224. Magnet 222 includes a rotary shaft 226 at its upper end, rotary shaft 226 being rotationally held by stem 228. A lower shaft 230 is formed as a flat strip having a quarter-bend with the bottom inserted through a rectangular key 232 of an actuating plate 234. A compression spring 236 provides return of push-button 220 and the rotatable magnet 222. In operation, depression of push-button 220 forces lower shaft 230 down through key 232 such that it effects a rotational movement of magnet 222, a movement sufficient to actuate the reed contacts of reed switch 224.

Figure 14:
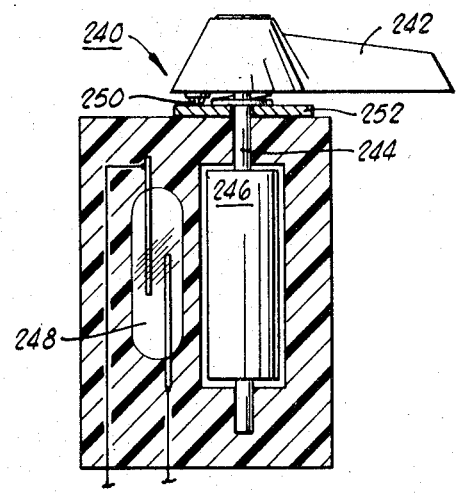
FIG. 14 is a vertical sectional view of a magnetically actuated reed switch which employs still another actuating mechanism.

FIG. 14 illustrates still another form of switch assembly 240 which utilizes a detent-type of switch actuation that includes a switch handle 242 affixed to a rotatable shaft 244 which has a magnet 246 secured thereon. A reed switch 248 is maintained in proper proximity adjacent magnet 246. A spring loaded detent ball 250 functioning in coaction with a detent plate 252 provides the necessary switch holding.

Figure 15:
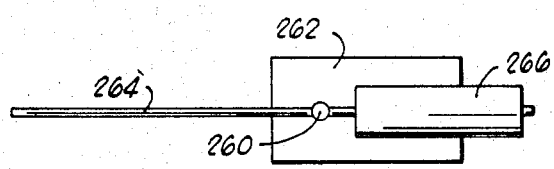
FIG. 15 is a plan view of a reed switch and a specific actuating arm.

FIG. 15 illustrates a scheme whereby a magnetic reed switch of the general type disclosed herein, i.e. utilizing narrow, ceramic magnets, can enable construction of an extremely sensitive switch. Thus, an actuating shaft 260 of rotary-actuated switch assembly 262 is affixed to an actuating lever 264 having a counter-balance 266 of selected weight affixed to the other end. Such a switch can be made extremely sensitive for any of various applications by adjustment of the length of actuating lever 264 versus the weight of counter-balance 266.

Figure 16:
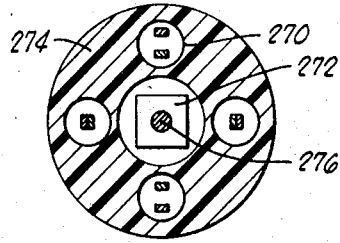
FIG. 16 is a sectional view of one form of a plural switch assembly utilizing the teachings of the invention.

The cross-sectional showing of FIG. 16 illustrates the manner in which a plurality of reed switches 270 can be actuated from a single rotational magnet 272, such plural switch structure being capable of inclusion within very compact packaging. Thus, a small cylinder of frame material 274, selected molding material of well-known type, can be formed around a rotatable magnet 272 as suspended on an actuating shaft 276 by suitable frame end structure (not specifically shown), and any of a number of reed switches 270 may be disposed within cylindrical frame 274 in proximate relationship to magnet 272.

The foregoing discloses a basic teaching which is applicable to the magnetically actuated reed switch art to bring about many advances in the nature of further compacting and ruggedizing of such switch devices. Such switches are able to provide reliable actuation in response to smaller rotational movement, and adjustment of various geometric considerations can bring about an extremely sensitive switch device as utilized for responding to an external movement. The switch as constructed in accordance with the present invention may be made much smaller than prior art forms of magnetic reed switch; actually, a plurality of ganged reed switches can be operated from one or more magnets within a much smaller volume than that generally required by prior types of magnetically actuated reed switches.

While the invention has been disclosed with regard to certain forms of frame and casing structure, it should be understood that many of the conventional switch construction techniques are equally applicable while their end result would be to utilize the teachings of the invention. It is also contemplated that some applications will benefit from particular contour shaping of the long dimension surfaces of the magnet members, thereby to gain certain advantages as to flux density and directivity. It should be noted too that the various metal forming, plastics molding and fastening techniques discussed herein may be conventional types, accepted rules of selection governing.

Changes may be made in the combination and arrangement of elements as heretofore set forth in the specification and shown in the drawings, it being understood that changes may be made in the embodiments disclosed without departing from the spirit and scope of the invention.

What is claimed is:
1. A magnetic switch assembly comprising:
reed switch means including first and second normally open magnetically actuated reed contacts;
magnet means formed unitarily from a homogenous magnetizable material into an elongated shape, said magnet means being magnetically polarized across the more narrow one of the dimensions;
frame means for securely holding said reed switch means, and rotatably holding said magnet means for rotation about the axis of the longest dimension and in actuating proximity to said reed switch means; and
actuation means movably connected to said frame means for rotating said magnet means by a predetermined amount about said magnet means axis which extends through the longest dimension thereof to effect closure of said first and second reed contacts.

2. A magnetic switch assembly as set forth in claim 1 wherein said magnet means comprises:
a rectangular solid of magnetic material which is cross-polarized in opposite directions through a narrow dimension at spaced positions along a long dimension.

3. A magnetic switch assembly as set forth in claim 1 wherein said magnet means comprises:
a rectangular solid of magnetic material which is cross-polarized in one direction through a narrow dimension of said solid.

4. A magnetic switch assembly as set forth in claim 3 wherein said reed switch means comprises:
off-set gap type switch means wherein a first contact is short and rigid while a second contact is longer and movable for intermittently contacting said first contact.

5. A magnetic switch assembly as set forth in claim 1 wherein said actuation means comprises:
actuation shaft means secured through said magnet means and being rotatably held within said frame means;
actuating lever means extending at right-angles from one end of said actuation shaft means, said actuation lever means including a guide eye for sensing the position of an external element; and
counter-balancing means secured to said actuation shaft means at right-angles thereto such that it moves to rotate said actuation shaft upon release of said actuation lever means.

6. A magnetic switch assembly as set forth in claim 1 wherein said actuation means comprises:
actuation shaft means secured through said magnet means and being rotatably held by said frame means;
vane means secured to one end of said shaft means such that it rotates said shaft means in response to movement.

7. A magnetic switch assembly as set forth in claim 1 wherein said actuation means comprises:
push-button means; and
linkage means connected to said push-button means to transmit rotational force to said magnet means in response to depression of said push-button means.

8. A magnetic switch assembly as set forth in claim 7 wherein said linkage means comprises:
lever means connected to rotate said magnet means about the axis of the long dimension,
said lever means being disposed beneath said push-button means to be moved in response to depression of the push-button means.

9. A magnetic switch assembly as set forth in claim 8 which is further characterized to include:
spring means secured to said frame means and said lever means to return said lever means to a rest position when no depression is applied to said push-button means.

10. A magnetic switch assembly as set forth in claim 7 wherein said actuation means comprises:
   a detent switch means.

11. A magnetic switch assembly as set forth in claim 1 which is further characterized to include:
   additional magnet means, each being of elongated shape which is magnetically polarized across a more narrow dimension, and each being disposed in actuating proximity to said reed switch means as so retained by said frame means.

12. A magnetic switch assembly as set forth in claim 7 wherein said linkage means comprises:
   lever means connected to rotate said magnet means about the axis of the long dimension;
   actuating shaft means connected to said push-button means and slidingly retained by said frame means;
   spring tab means affixed on said actuating shaft and being oriented to contact said lever means to rotate the magnet means upon push-button depression through a preset arc of rotation whereupon it is released from control of said lever means until a next following push-button depression.

13. A magnetic switch assembly as set forth in claim 3 which is further characterized in that:
   said solid of magnetic material is disposed parallel to said reed switch means to extend along the length of a more distant one of said normally open reed contacts.

14. A magnetic switch assembly as set forth in claim 13 which is further characterized in that:
   said magnetic material is a ceramic composition.

15. A magnetic switch assembly as set forth in claim 1 which is further characterized in that:
   said magnet means is two solids of magnetic material polarized in opposite directions through respective thin dimensions and being disposed in alignment on the axes of the long dimension which, in turn, is disposed parallel to said reed switch means.

16. A magnetic switch assembly as set forth in claim 2 which is further characterized in that:
   said magnetic material is a ceramic composition.

References Cited
UNITED STATES PATENTS 3,418,610   12/1968   Hammond _____ 335—206X BERNARD A. GILHEANY, Primary Examiner R. N. ENVALL, JR., Assistant Examiner U.S. Cl. X.R.

335—206, 207